United States Patent [19]

Mittmann

[11] 4,395,225

[45] Jul. 26, 1983

[54] BURNER OPERATED WITH LIQUID FUEL FOR HEATING DEVICES

[75] Inventor: Bernd Mittmann, Munich, Fed. Rep. of Germany

[73] Assignee: Webasto-Werk W. Baier GmbH and Co., Munich, Fed. Rep. of Germany

[21] Appl. No.: 241,369

[22] Filed: Mar. 6, 1981

[30] Foreign Application Priority Data

Mar. 15, 1980 [DE] Fed. Rep. of Germany ....... 3010078
Jan. 13, 1981 [DE] Fed. Rep. of Germany ....... 3100744

[51] Int. Cl.³ ............................................. F23N 5/00
[52] U.S. Cl. ....................................... 431/62; 236/96; 431/351
[58] Field of Search ........................... 431/62, 63, 351; 236/96

[56] References Cited

U.S. PATENT DOCUMENTS

| | | | |
|---|---|---|---|
| 2,226,613 | 12/1940 | McCollum | 431/63 |
| 2,260,535 | 10/1941 | McCollum | 431/63 X |
| 3,364,969 | 1/1968 | Stephenson | 431/62 |
| 3,869,246 | 3/1975 | Hammond, Jr. et al. | 431/351 |

*Primary Examiner*—William E. Wayner
*Attorney, Agent, or Firm*—Antonelli, Terry & Wands

[57] ABSTRACT

A burner for use with liquid fuels in heating devices, especially vehicle heaters, as a low pressure atomizer arranged at one end of a combustion chamber that includes a burner insert and a nozzle projecting into an end of the burner insert that faces away from the combustion chamber, and a supply means for feeding a fuel and a primary air stream into the nozzle, at least the quantity of primary air passing through the burner being controllable automatically by a flow control valve and arrangement in dependence upon the temperature of the burner. Additionally, in accordance with preferred embodiments the flow control valve arrangement may be either a bimetallic ring or a bimetallic strip which opens or blocks off the passage of air in dependence on the temperature. In addition to controlling the primary combustion air, controlling of secondary air is also provided.

27 Claims, 7 Drawing Figures

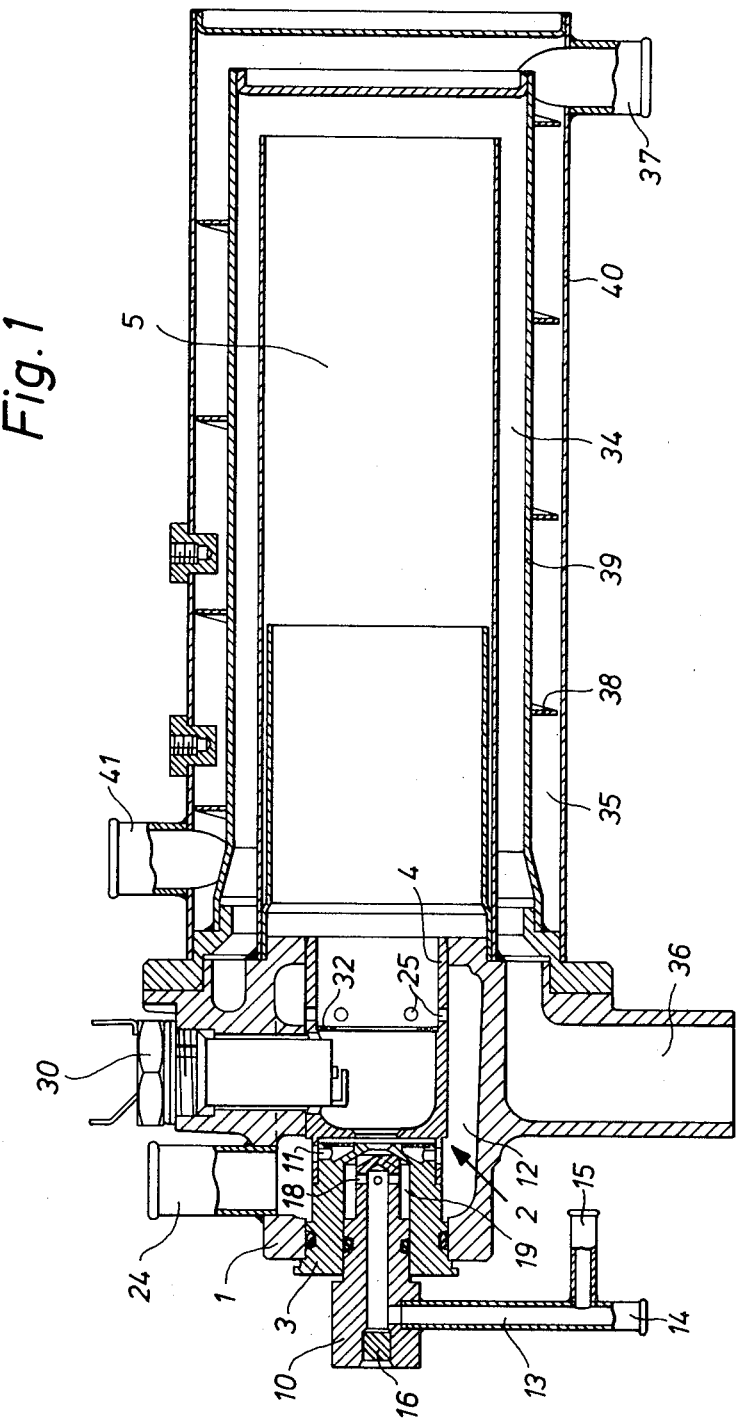

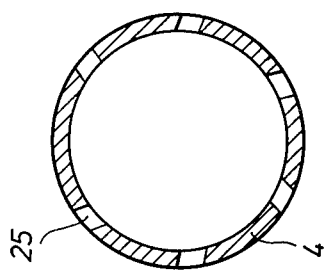
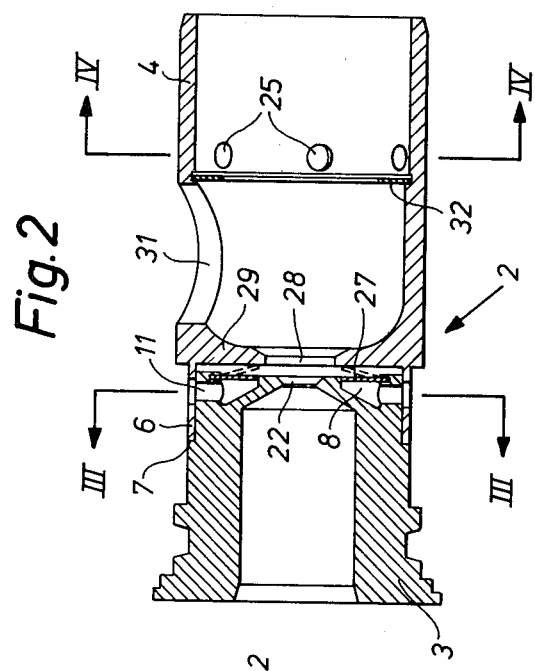
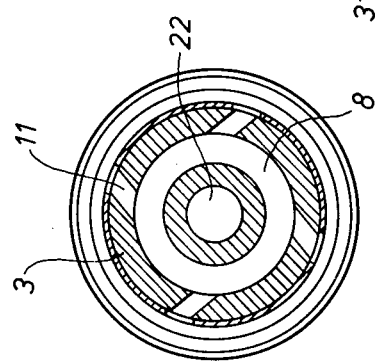
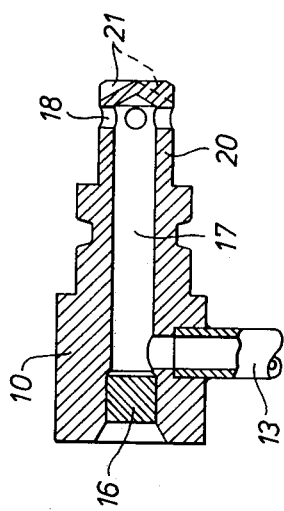

BURNER OPERATED WITH LIQUID FUEL FOR HEATING DEVICES

BACKGROUND AND SUMMARY OF THE INVENTION

The invention relates to a burner operated with liquid fuel for heating devices, especially vehicle heaters, with a low-pressure atomizer arranged at one end of a combustion chamber, this atomizer being formed by a burner insert and a nozzle, the latter projecting into the end of the burner insert facing away from the combustion chamber, this nozzle being fed with fuel and a primary air stream.

In burners of this type, combustion residues tend to accumulate in the zone of the burner insert. Such deposits require a relatively frequent servicing of the burner. Although the depositing of combustion residues can be basically counteracted by increasing the amount of primary air for the burner, such a step results in impaired cold-start properties in conventional burners.

Thus, the invention has for an object, providing a burner that permits a prolongation of the servicing intervals by reduced accumulation of residues without a concomitant impairment of the cold-start properties.

Starting with a burner of the type described above, this object has been attained according to a preferred embodiment of the invention by providing that at least the primary air quantity passing through the burner is automatically controllable in dependence on the burner temperature. In a burner constructed according to this invention, the amount of primary air can be set so that a perfect cold start is ensured by a rich mixture. As soon as the burner has reached its operating temperature, however, an automatic increase in leanness of the mixture is effected by increasing the amount of primary air fed to the burner. Thereby, deposits of combustion residues are effectively prevented.

According to a preferred embodiment of the invention, the burner insert is equipped with a feed line for supplemental primary air stream. An air valve controlled in dependence on the burner temperature is located in this feed line, by means of which the feed of supplemental primary air can be blocked at least partially when the burner is cold. In the starting phase, the operation is thus conducted without supplemental primary air, or at least with only a small quantity of such air. However, once the burner has been brought to the operating temperature and atomization or vaporization of the liquid fuel is ensured, the feed line for the supplemental air stream is fully opened. The total amount of primary air is correspondingly increased.

The feed line for supplemental primary air can suitably be constituted by a ring chamber located in the zone of the end of the nozzle on the side of the combustion chamber. Preferably, a bimetal ring is disposed in this ring chamber, which ring release or at least partially blocks the passage of supplemental primary air in dependence on the temperature. Such a solution is distinguished by a particularly simple structure and high operating safety.

Advantageously, the ring chamber is equipped with one or several supplemental primary air inlet ports, forming an acute angle with the radial direction. This effects a swirl in the introduced supplemental primary air. The supplemental primary air flows in contact with the wall of the burner insert and effectively blasts away any fuel droplets or any originating combustion residues.

The burner insert is suitably provided with a nozzle connection (socket) and a burner tube lying coaxially thereto, both of which define the ring chamber and are in communication with each other, preferably via a heat reflux throttle (choke). The heat reflux throttle limits the heat returned to the nozzle connection to an amount sufficient, on the one hand, for fuel vaporization, but, on the other hand, to avoid a heating up of the nozzle connection to a temperature at which the burner fuel will undergo a cracking process.

The burner tube may simply be equipped with a thin-walled tubular extension on the end facing away from the combustion chamber, in order to form the heat reflux throttle; the end of the nozzle connection on the combustion chamber side extends into this extension to such a degree that its front face lies at a spacing from the adjacent end face of the burner tube.

The bimetal ring is advantageously mounted with its outer periphery to the end of the nozzle connection on the combustion chamber side and can be deflected under the effect of the operating temperature of the burner into the space between the forward end face of the nozzle connection and the ajacent end face of the burner tube.

To exclude a damming-up effect upstream of the burner tube, the cross section of the burner tube inlet port is preferably larger than the cross section of the primary air/fuel outlet port of the nozzle connection.

In a further development of the invention, the burner insert is additionally provided with a constriction ring axially at a spacing from the end of the nozzle on the combustion chamber side, whereby a heat accumulation effect is ensured in the zone of the burner tube lying in front of the constriction ring, and as a result an especially quiet combustion can be obtained.

The burner insert can be equipped with secondary air inlet ports in a zone located axially at a spacing from the nozzle, these inlet ports being suitably fashioned as swirl bores. Advantageously, the burner insert is seated in a burner head defining, together with the outer surface of the burner insert, an air chamber. From this air chamber, the burner can be fed with supplemental primary air as well as with secondary air.

The residue deposits can be even further reduced in another embodiment of the invention by providing that, additionally, the amount of a secondary air stream fed to the burner is likewise automatically controllable in dependence on the burner temperature. In this arrangement, an air valve controlled in dependence on the burner temperature is preferably disposed in a combined feed line for the primary and secondary air streams; by means of this air valve, the feed of primary and secondary air can be at least partially blocked off when the burner is cold. In the start-up phase, the valve reduces the amount of combustion air introduced in total to any desired degree and then opens up the combined feed line for the primary and secondary air streams upon attainment of the operating temperatures, thus correspondingly increasing the quantity of combustion air.

The combined feed line for primary and secondary air can suitably constitute a ring chamber located in the region of the end of the nozzle on the combustion chamber side; a combustion air connection pipe terminates in this ring chamber, preferably in a substantially tangential direction. This arrangement ensures an extensively uniform and effective distribution of the combustion air. To provide automatic control of the primary and secondary air qualities, a bimetallic strip is advantageously located at the entrance point of the combustion air connection pipe into the ring chamber, this strip releasing or at least partially blocking the air feed in dependence on the temperature. Such a solution is distinguished by particular constructional simplicity and high operating safety. In this connection, the burner insert suitably exhibits a nozzle connection in communication with the ring chamber via primary air inlet ducts and secondary air inlet ducts being in communication with a space lying in the zone of the forward end section of the nozzle connection.

These and further objects, features and advantages of the present invention will become more obvious from the following description when taken in connection with the accompanying drawings which show, for purposes of illustration only, several embodiments in accordance with the present invention.

BRIEF DESCRIPTION OF THE DRAWINGS

FIG. 1 shows schematically a longitudinal section through a heater equipped with a burner according to this invention.

FIG. 2 shows a longitudinal sectional view of a burner insert.

FIG. 3 shows a section along line III—III in FIG. 2.

FIG. 4 shows a section along line IV—IV in FIG. 2.

FIG. 5 shows a longitudinal section through a nozzle of the burner according to FIG. 1.

DETAILED DESCRIPTION OF THE PREFERRED EMBODIMENTS

Figure 6:
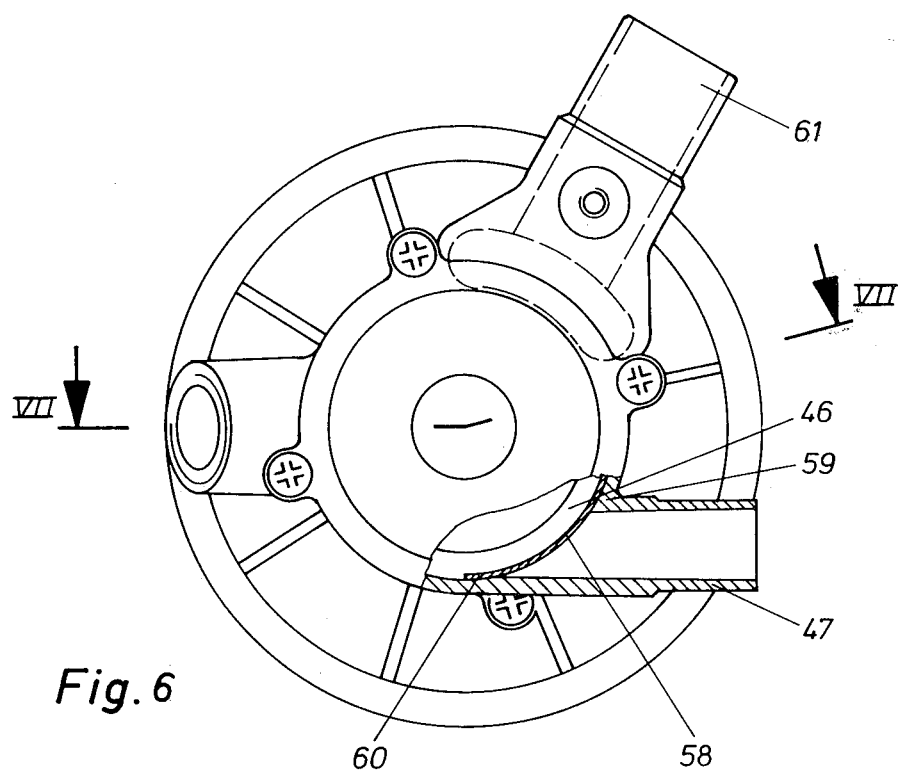
FIG. 6 shows a partial-section bottom view of a heater according to a modified embodiment.

The heater illustrated in FIG. 1 comprises a burner head 1 with a burner insert 2 constituted by a nozzle socket member 3 and a burner tube 4 located coaxially thereto. The burner tube 4 carries, on its end facing away from the combustion chamber 5, a thin-walled, tubular extension 6 surrounding the end of the nozzle connection 3 on the burner tube side and resting against a shoulder 7 of the nozzle connection 3. The length of the extension 6 and the position of the shoulder 7 are selected so that the nozzle connection member 3 and the burner tube 4 together define a ring chamber 8. The ring chamber 8, lying in the zone of the end of the nozzle connection member 3 on the combustion chamber side. A nozzle 10 inserted in the nozzle connection member, is in communication with an air chamber 12 via bores 11 of the nozzle connection member 3 and the extension 6 which are distributed in the peripheral direction, this air chamber being defined by the outside wall of the burner insert 2 and the inside wall of the burner head 1. As can be seen from FIG. 3, the bores 11 form an acute angle with the radial direction.

The nozzle 10 is connected to a feed line 13 fed at 14 with air and at 15 with liquid fuel, especially oil. The air/fuel mixture enters a central bore 17 of the nozzle 10, which is blocked by means of a plug at an outer end 16, and from there passes via transverse bores 18 into a vaporizing chamber 19 formed between the outer wall of the forward nozzle portion 20 and the inner wall of the nozzle connection 3. Swirl ducts 21 provided at the front end of the nozzle 10 take care of establishing a communication between the vaporizing chamber 19 and the outlet port 22 of the nozzle connection 3.

Air is fed into the air chamber 12 via a pipe connection 24. This air can pass from there via the bores 11 into the ring chamber 8. Another portion of this air can enter the burner tube 4 via obliquely extending swirl apertures 25 in the form of secondary air. A bimetal ring 27 is attached in the zone of its outer circumference at the end of the nozzle connection 3 on the combustion chamber side. When the burner is cold, the bimetal ring 27 blocks the connection between the bores 11 and the burner tube inlet port 28 arranged in the end wall 29 of the burner tube 4 facing the nozzle connection 3 coaxially to the outlet port 22. The bimetal ring 27 passes over into the position shown in dashed lines in FIG. 2 once the burner has attained its operating temperature, so that air can pass from the air chamber 12 via the bores 11 and the ring chamber 8 into the burner tube 4 as supplemental primary air. A glow plug 30 projects through a lateral opening 31 of the burner tube 4 into the latter. A throttle ring 32 is disposed in the zone between the glow plug 30 and the swirl apertures 25.

Exhaust gases exiting from the combustion chamber 5 are deflected at the end of the combustion chamber 5 facing away from the burner insert 2 and flow through a hot-gas duct 34 between the combustion chamber wall and a water jacket 35. These gases exit from the device via an exhaust gas pipe 36. Water to be heated enters the water jacket via an inlet pipe connection 37. The water is conducted by means of a guide coil 38 between the inner wall 39 and the outer wall 40 of the water jacket 35 in a helical path toward the outlet pipe connection 41.

The above-described devices operate as follows:

With the burner being initially cold, primary air and liquid fuel are fed into the nozzle 10. The air/fuel mixture passes via the outlet port 22 and the inlet port 28 into the burner tube 4. In the latter, the mixture is ignited by means of the glow plug 30. The bimetal ring 27 is in the closing position. The feed of supplemental primary air is blocked off. A rich mixture is obtained which burns without any cold-start problems.

As the burner tube 4 is heated by the flame, a portion of the heat is passed on via the extension 6, acting as a heat reflux throttle, to the nozzle connection member 3 and from the latter to the nozzle 10. By a corresponding cross-sectional dimensioning of the extension 6, care is taken that the nozzle connection 3 is heated to a temperature sufficient for perfect vaporization of the mixture in the chamber 19; however, this temperature is not so high that cracking of the burner fuel occurs in the zone of the nozzle connection. The end wall 29 of the burner tube 4 acts as radiation protection, to exclude excessive heating of the nozzle connection 3. To avoid, on the other hand, an undesirable damming-up effect in front of the end wall 29, the burner tube inlet port 28 is made of a larger dimension than the outlet port 22 of the nozzle connection 3.

Under the effect of the burner heat, the bimetal ring 27 passes over into the position shown in dashed lines in FIG. 2, and thereby opens up the feed of supplemental primary air. The mixture is rendered leaner. In conjunction with the swirl movement of the supplementary primary air effected by the bores 11, the effect is attained that combustion commences directly behind the port 28. Thereby the burner tube 4 is heated up to such an extent that the deposition of combustion residues in the burner tube 4 and at the plug 30 is effectively prevented. The constriction ring 32 takes care of a certain back-up effect. Combustion takes place extensively uniformly and quietly.

Figure 7:
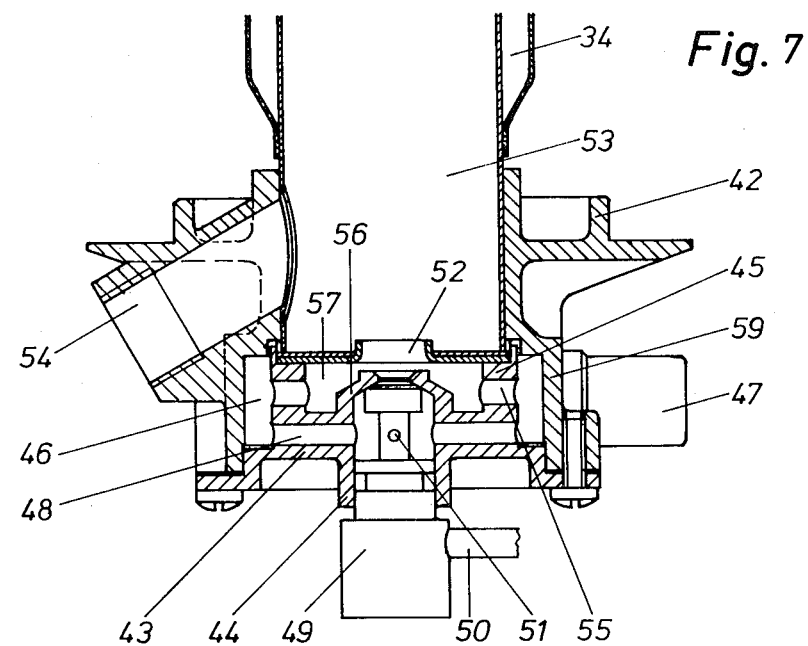
FIG. 7 is a partial sectional view along line VII—VII in FIG. 6.

The modified embodiment of the heater illustrated in FIGS. 6 and 7 comprises a burner head 42 with a burner insert 43 essentially constituted by a nozzle connection member 44 and an annular wall 45 concentric thereto. The burner head 42 and the burner insert 43 together define a ring chamber 46 into which terminates a combustion air pipe connection 47 essentially tangentially. Primary air inlet ducts 48 lead from the ring chamber 46 to the nozzle connection 44, which latter receives a nozzle 49. Fuel is fed to the nozzle 49 via a nipple 50 while primary air fed from the inlet ducts 48 enters air inlet bores 51 of the nozzle 49. One of the bores 51 is indicated in FIG. 7. Fuel and primary air are intermixed within the nozzle 49. The mixture passes via a passage 52 into a combustion chamber 53. In the latter, the mixture is ignited by means of a spark plug inserted in a mounting 54 of the burner head 42. Furthermore, secondary air inlet ducts 55 emanate from the ring chamber 46 and are in communication with a space 57 lying in front of the forward end section 56 of the nozzle connection 44. Secondary air passes from space 57 via the passage 52 likewise into the combustion chamber 53.

For the temperature-dependent control of primary and secondary air, a bimetal strip 58 is arranged at the point where the combustion air pipe connection 47 terminates into the ring chamber 46 (FIG. 6). In the cold operating condition of the heater, i.e. before and during start-up, the bimetal strip 58 blocks the feed of combustion air via the pipe connection 47 into the ring chamber 46 entirely or extensively. In the starting phase, a rich mixture is thus produced. Once the burner head 42 has reached operating temperature, heat is transferred via the wall 59 of the burner head to the bimetal strip 58. The free end 60 of the bimetal strip 58 is lifted off the wall 59 and moves inwardly, thus freeing the feed of combustion air, see FIG. 6. The fuel-primary air mixture flowing into the combustion chamber 53 is made leaner by increasing the amount of primary air. At the same time, the quantity of secondary air entering the chamber 57 via the ports 55 is enlarged.

The combustion chamber 53 is surrounded, in the manner shown in connection with the embodiment of FIG. 1, by a hot-gas duct 34 formed between the combustion chamber wall and a water jacket, the exhaust gases exiting from the combustion chamber being deflected at the end of the combustion chamber 53 facing away from the burner insert 43, flowing through the hot-gas duct 34 and leaving the device via an exhaust pipe 61 (FIG. 6).

While the stream of combustion air is influenced by the bimetal strip 58 before being divided into primary and secondary air, according to the embodiment of FIGS. 6 and 7, it is also possible to automatically control the primary and secondary air streams respectively separately in dependence on the burner temperature, such as by utilizing bimetal strips to influence the air flow after it is divided into primary and secondary air.

It is furthermore understood that the invention is not limited to the illustrated examples. The invention can be utilized, not only in water heaters, as referred to above, but also in air heaters such as the type of heater known, for example, from DAS (German Published Application) No. 2,453,202. Instead of a vaporizing atomizer, rotating atomizers may likewise be employed. Also, the temperature-dependent control of the primary and/or secondary air quantities may take place by means other than by way of bimetal elements, such as by other temperature sensitive means, valving operated in response to temperature responsive transducers or the like.

Thus, I do not wish the present invention to be limited to the specific embodiments shown and described herein, but rather intend to cover all such changes and modifications as are encompasssed by the scope of the appended claims.

I claim:

1. Burner operated with liquid fuel, for heating devices, especially for vehicle heaters, comprising a low-pressure atomizer arranged at one end of a combustion chamber, said atomizer including a burner insert and a nozzle projecting into an end of the burner insert facing away from the combustion chamber, supply means for feeding a fuel and a primary air stream into said nozzle, and flow control means for automatically controlling at least the quantity of primary air passing through the burner in dependence on the temperature of the burner, further comprising flow control means for automatically controlling the quantity of a second air stream fed to the burner in dependence on the burner temperature.

2. Burner according to claim 1, characterized in that the supply means comprises a feed line for supplemental primary air stream provided in the burner insert, and said flow control means comprises an air valve controlled in dependence on the temperature of the burner, and air valve being arranged in the feed line, and wherein the air valve is operable to at least partially block off the feed of supplemental primary air when the burner is cold.

3. Burner according to claim 2, characterized in that the feed line for supplemental primary air forms a ring chamber disposed in a zone of an end of the nozzle on the combustion chamber side.

4. Burner according to claim 3, characterized in that a bimetal ring is arranged in the ring chamber and said bimetal ring releasing or at least partially blocking the flow of supplemental primary air in dependence on the temperature of the burner.

5. Burner according to claim 4, characterized in that the burner insert has a nozzle connection member and a burner tube disposed coaxially with respect thereto, the ring chamber being defined between said connection member and said burner tube.

6. Burner according to claim 5, characterized in that the nozzle connection member and the burner tube are connected with each other by way of a heat reflux throttle.

7. Burner according to claim 5 or 6, characterized in that the feed line for supplemental primary air forms a ring chamber disposed in a zone of an end of the nozzle on the combustion chamber side.

8. Burner according to claim 6, characterized in that the burner tube has a thin-walled, tubular extension at an end facing away from the combustion chamber comprising said heat reflux throttle, an end of the nozzle connection member on the combustion chamber side extending into this extension to such a degree that its forward end face lies spaced from an adjacent end face of the burner tube.

9. Burner according to claim 8, characterized in that the bimetal ring is attached at its periphery to the end of the nozzle connection member on the combustion chamber side, and under the influence of the burner operating temperature, is deflected into the spacing between the forward end face of the nozzle connection and the adjacent end wall of the burner tube.

10. Burner according to one of claims 5, or 6 or 8 or 9 characterized in that the cross section of a burner tube inlet port is larger than the cross section of a primary air/fuel outlet port of the nozzle connection member.

11. Burner according to claim 10, characterized in that the burner insert is provided axially with a constriction ring at a spacing from the end of the nozzle on the combustion chamber side.

12. Burner according to claim 11, characterized in that the burner insert is provided with secondary air inlet ports in a zone lying axially at a spacing from the nozzle.

13. Burner according to claim 12, characterized in that the secondary air inlet ports of the burner insert are arranged on a side of the constriction ring facing away from the nozzle connection member.

14. Burner according to claim 12, characterized in that the secondary air inlet ports are fashioned as swirl bores.

15. Burner according to claim 3 or 4, characterized in that the ring chamber is provided with at least one supplemental primary air inlet port that is arranged at an acute angle with respect to a radial direction.

16. Burner according to claim 15, characterized in that the burner insert has a nozzle connection member and a burner tube disposed coaxially with respect thereto, the ring chamber being defined between said connection member and said burner tube.

17. Burner according to claim 16, characterized in that the nozzle connection member and the burner tube are connected with each other by way of a heat reflux throttle.

18. Burner according to claim 17, characterized in that the burner tube has a thin-walled, tubular extension at an end facing away from the combustion chamber comprising said heat reflux throttle, an end of the nozzle connection member on the combustion chamber side extending into this extension to such a degree that its forward end face lies spaced from an adjacent end face of the burner tube.

19. Burner according to claim 1 or 2 or 3 or 4, characterized in that the burner insert is mounted in a burner head which, together with the outer surface of the burner insert, defines an air chamber.

20. Burner according to claim 1 characterized in that both said flow control means comprise an air valve controlled in dependence on the burner temperature, said air valve being located in a combined feed line for the primary and seconary air streams forming part of said supply means and operable to partially block off the feed of primary and secondary air at least when the burner is cold.

21. Burner according to claim 20, characterized in that the combined feed line for primary and secondary air forms a ring chamber that is located in a zone of the end of the nozzle on the combustion chamber side, a combustion air connection terminating into said ring chamber.

22. Burner according to claim 21, characterized in that the combustion air connection terminates into the combustion chamber in an essentially tangential direction.

23. Burner according to claim 21, characterized in that said air valve comprises a bimetal strip disposed at an entrance point of the combustion air connection into the ring chamber, the bimetal strip opening up or at least partially blocking off the passage of air in dependence on the temperature.

24. Burner according to claim 21 or 22 or 23, characterized in that the burner insert has a nozzle connection connected to the ring chamber via primary air inlet ducts, and secondary air inlet ducts branching off from the ring chamber, said ducts being in communication with a space located in a region of a forward end section of the nozzle connection.

25. Burner according to claim 1 or 2, wherein said flow control means comprises a bimetalic valving arrangement.

26. Burner according to claim 25, comprising supply means for feeding a secondary air stream to the burner insert, and wherein said valving arrangement is operable to control the secondary air stream.

27. Burner according to claim 26, wherein said valving arrangement comprises a single bimetallic element that is operable to conjointly influence said feeding of primary and secondary air.

* * * * *